(12) United States Patent
Kassner

(10) Patent No.: US 7,772,837 B2
(45) Date of Patent: Aug. 10, 2010

(54) METHOD FOR CODING AN OUTPUT SIGNAL OF A SENSOR

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 12/004,249

(22) Filed: Dec. 19, 2007

(65) Prior Publication Data

US 2008/0158039 A1    Jul. 3, 2008

(30) Foreign Application Priority Data

Dec. 27, 2006    (DE) .................. 10 2006 061 572

(51) Int. Cl.
*G01B 7/30* (2006.01)
(52) U.S. Cl. ............................. 324/207.25; 73/514.39
(58) Field of Classification Search ............ 324/207.2, 324/207.25, 251; 73/514.31, 514.39
See application file for complete search history.

(56) References Cited

U.S. PATENT DOCUMENTS

| 4,262,251 | A | * | 4/1981 | Fujishiro et al. | ....... 324/207.25 |
| 2004/0095130 | A1 | * | 5/2004 | Yokotani et al. | ....... 324/207.21 |

* cited by examiner

*Primary Examiner*—Bot L LeDynh
(74) *Attorney, Agent, or Firm*—Kenyon & Kenyon LLP

(57) ABSTRACT

A method for coding an output signal of a sensor of an apparatus for determining a rotation angle of a shaft, in particular of a crankshaft of an internal combustion engine, the shaft being joined to a sensor wheel having teeth and tooth gaps having an asymmetrical pitch, and the sensor wheel having associated with it at least one differential sensor encompassing two sensor elements, the differential sensor generating an output signal that is a difference of signals of the two sensor elements, the output signal being a square-wave signal that can assume a first value or a second value. The rotation direction of the shaft, as well as a pitch ratio of a tooth sweeping past the sensor with respect to an adjacent tooth gap, are ascertained from the signals of the two sensor elements, and the rotation direction as well as the pitch are coded as a pulse width coded output signal.

9 Claims, 4 Drawing Sheets

US 7,772,837 B2

METHOD FOR CODING AN OUTPUT SIGNAL OF A SENSOR

FIELD OF THE INVENTION

The present invention relates to an apparatus and a method for coding an output signal of a sensor of an apparatus for determining a rotation angle of a shaft, in particular of a crankshaft of an internal combustion engine, the shaft being joined to a sensor wheel having teeth and tooth gaps having an asymmetrical pitch, and the sensor wheel having associated with it at least one differential sensor encompassing two sensor elements, the differential sensor generating an output signal that is a difference of signals of the two sensor elements, the output signal being a square-wave signal that can assume a first value or a second value. The present invention furthermore relates to a computer program for carrying out such a method.

BACKGROUND INFORMATION

A determination of the crankshaft angle is of central importance in terms of controlling internal combustion engines. Approaches known in the existing art utilize, in particular, incremental sensors on the crankshaft and/or camshaft. Sensor disks having increment marks encompassing teeth and tooth gaps, which in coaction with the signals from the crankshaft and camshaft enable a determination of the engine position, are usual.

Sensor systems of this kind allow a determination of the absolute position of the crankshaft by way of a non-uniform placement of the increment marks. A typical implementation is a sensor wheel having 60 minus 2 teeth, i.e. 58 teeth, and a two-tooth sensor-wheel gap.

A disadvantage of such a gap is the absence of increments for exact determination of the crankshaft angle within the gap. Within the gap, an extrapolation of the crankshaft angle is performed by the engine controller, although that extrapolation is error-prone because of the non-uniformity of the crankshaft angle speed. Modern working methods for internal combustion engines impose more stringent requirements in terms of accuracy, in particular for determining the location of injection operations, for both Otto-cycle and diesel engines.

It is possible to avoid the sensor-wheel gap by an asymmetrical pitch of the increment markings and thus an asymmetrical pitch of the teeth with respect to tooth gaps. Instead of a sensor-wheel gap, here the pitch between teeth and tooth gaps is modified over one or more tooth/tooth-gap pairs. To increase the accuracy with which this modification is detected, usually the teeth and tooth gaps together are already configured asymmetrically, and the asymmetry in the region replacing the previous sensor-wheel gap is, for example, simply turned around. For example, if the teeth extend over a crankshaft angle of 4°, and the tooth gaps over a crankshaft angle of 2°, then the sensor-wheel gap is replaced by a reversal of this ratio, i.e. by teeth of, for example, 2° and tooth gaps of, for example, 4°.

With evaluation of the trailing tooth edges, a signal is available for an engine controller every 6° of crankshaft angle, even in the former gap, and in addition a demonstrable position of the sensor wheel is detected by evaluating the ratio between the tooth time and gap time.

Additional evaluation of the ratio between tooth time and gap time is complicated by what is today the typical embodiment of the crankshaft angle sensor. As a rule, these sensors are so-called differential sensors, in which signal processing encompasses appropriate calculation of a difference between sensor elements that are spatially separated from one another. An important advantage as compared with a so-called single sensor having only one sensor element is greatly improved reproducibility of the sensor signal. Improved reproducibility means a decrease in statistical errors upon acquisition and sampling of the sensor wheel's increment markings. Any changes in the magnetic field due to external interference fields or changes in the air gap of the sensor wheel have an effect on the switching threshold of the sensor in the case of a single sensor, but cancel each other out in the case of a differential sensor. The differential sensor is therefore more robust in terms of installation positions and external magnetic fields. The differential sensor switches at the center of the tooth or tooth gap at the zero transition of the differential signal. An asymmetrically apportioned sensor wheel generates an asymmetrical output signal only once, upon the transition from one tooth-to-space pitch to a different tooth-to-space pitch. A ratio of tooth time to gap time that is not equal to one is therefore available to an evaluation function in the engine controller only at the beginning and the end of the modified tooth pitch replacing the previous sensor-wheel gap. In terms of sensing of the rest of the sensor wheel, the tooth-to-gap time is approximately the same despite the asymmetrical tooth pitch.

It is furthermore known additionally to evaluate the rotation direction of the crankshaft. One known approach to transferring this information to an engine control unit is to use a variable pulse length. Because the engine control unit employs only one of the edges, usually the leading edge, for incremental determination of the angle traveled by the crankshaft, the other edge can be used to code further data. The rotation direction is transferred in this case by way of a change in the pulse length.

The existing art is disadvantageous in that evaluation of a sensor-wheel gap, or of a modified pitch of the sensor wheel replacing the sensor-wheel gap, is possible only on the basis of detection of the leading edges that are transmitted to an engine control unit.

SUMMARY OF THE INVENTION

It is therefore an object of the present invention to provide a method that enables improved detection of a modified pitch of a sensor wheel replacing the sensor-wheel gap.

This problem is solved by a method for coding an output signal of a sensor of an apparatus for determining a rotation angle of a shaft, in particular of a crankshaft of an internal combustion engine, the shaft being joined to a sensor wheel having teeth and tooth gaps having an asymmetrical pitch, and the sensor wheel having associated with it at least one differential sensor encompassing two sensor elements, the differential sensor generating an output signal that is a difference of signals of the two sensor elements, the output signal being a square-wave signal that can assume a first value or a second value, the rotation direction of the shaft, as well as a pitch ratio of a tooth sweeping past the sensor with respect to an adjacent tooth gap, being ascertained from the signals of the two sensor elements, and the rotation direction as well as the pitch being coded as a pulse width coded output signal.

Provision is preferably made that the pitch be an angle segment of one tooth with respect to an angle segment of a succeeding tooth gap. The angle segment of a tooth and the angle segment of a tooth gap are the angle swept out by them on the sensor wheel. In the case of sensor wheels known in the existing art and having a 6-degree pitch, the two add up in each case to 6°.

Provision is further preferably made that the sweeping of a leading tooth edge of the sensor wheel past the sensor be coded in real time as an edge, and that a counter-edge following the edge be generated at an offset in time from the edge, which offset codes the rotation direction as well as the pitch. "Edge" and "counter-edge" are understood here as the combination of a leading edge with a trailing edge. If the edge is a leading edge, the counter-edge is therefore a trailing edge, and vice versa.

Provision is further preferably made that the rotation direction be ascertained from the sequence in time of the signals of the sensor elements. The signals of the sensor elements follow one another in time, since they are arranged next to one another when viewed in the rotation direction of the sensor wheel. Provision is preferably further made that the pitch be ascertained from the signal of one of the sensor elements.

The aforesaid problem is also solved by a sensor of an assemblage for determining a rotation angle of a shaft, in particular of a crankshaft of an internal combustion engine, the shaft being joined to a sensor wheel having teeth and tooth gaps having an asymmetrical pitch, and the sensor wheel having at least one sensor associated with it, the sensor encompassing two sensor elements and generating at least one output signal that is a difference signal of signals of the two sensor elements, the output signal being a square-wave signal that can assume a first value or a second value, wherein the rotation direction of the shaft, as well as a pitch ratio of a tooth sweeping past the sensor with respect to an adjacent tooth gap, is ascertained from the signals of the two sensor elements, and the rotation direction as well as the pitch are coded as a pulse width coded output signal.

The aforesaid problem is also solved by a computer program having program code for carrying out all the steps in accordance with the method according to the present invention when the program is executed in a computer.

DETAILED DESCRIPTION

Figure 1:
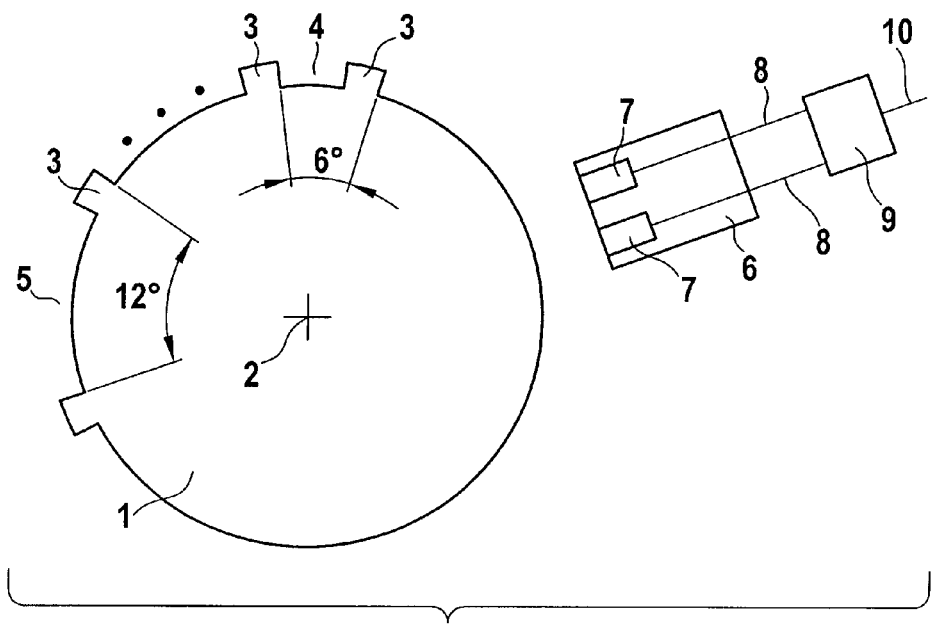
FIG. 1 is a sketch of a sensor wheel having an associated sensor.

FIG. 1 is a sketch of a sensor wheel 1, known per se, that is joined to a crankshaft (not depicted here) of an internal combustion engine and, upon a rotation of the crankshaft, rotates about an axis 2. Sensor wheel 1 has sensor-wheel marks (markings) that are formed by an alternating disposition of teeth 3 and tooth gaps 4. The spacing between successive pairs of teeth 3 and tooth gaps 4 is 6°. Teeth 3 and tooth gaps 4 can extend over an identical angle range of 3°, but can also be apportioned asymmetrically, for example such that a tooth 3 covers an angle range of 2° and a tooth gap 4 covers an angle range of 4°. A sensor-wheel gap 5 is formed by the fact that omission of one tooth 3 results in a sensor-wheel gap 5 having an angle of 12°.

A sensor 6 is associated with sensor wheel 1. Sensor 6 encompasses two sensor elements 7 that can be, for example, Hall elements, inductive sensors, or the like. Sensor elements 7 supply, via signal lines 8, electrical signals from which, in an evaluation logic unit 9, a difference signal is created that is transferred via a signal line 10 to a control unit (not depicted) of the internal combustion engine. The motion of teeth 3 and tooth gaps 4 past sensor elements 7 generates voltage changes at outputs of sensor elements 7 that are conveyed via signal lines 8 to evaluation logic unit 9. Sensor elements 7 are disposed with an offset in the circumferential direction of sensor wheel 1, so that upon a rotation of sensor wheel 1, a tooth 3 or a tooth gap 4 is carried in time-offset fashion firstly past one of the two sensor elements 7 and then past the other of the two sensor elements 7.

Instead of providing a sensor-wheel gap 5 in sensor wheel 1, it is known to implement an asymmetrical pitch for the sensor wheel. One or more pairs of tooth 3 plus tooth gap 4 therefore exist, which together cover an angle of 6° on sensor wheel 1 but for which the apportioning of tooth 3 with respect to tooth gap 4 is modified. For example, if the apportioning of tooth with respect to tooth gap is 3° in each case, each tooth 3 therefore covers an angle of 3° on sensor wheel 1 and each tooth gap 4 covers an angle of 3° on sensor wheel 1, and a demonstrated marking can then be implemented by the fact that, for example, a pair constituting a tooth 3 plus tooth gap 4 exhibits a different apportioning, for example by the fact that a tooth extends over an angle of 2° and the relevant tooth gap 4 extends over an angle of 4°. To allow more reliable detection, such markings can also be disposed in multiple fashion one behind another.

Figure 2:
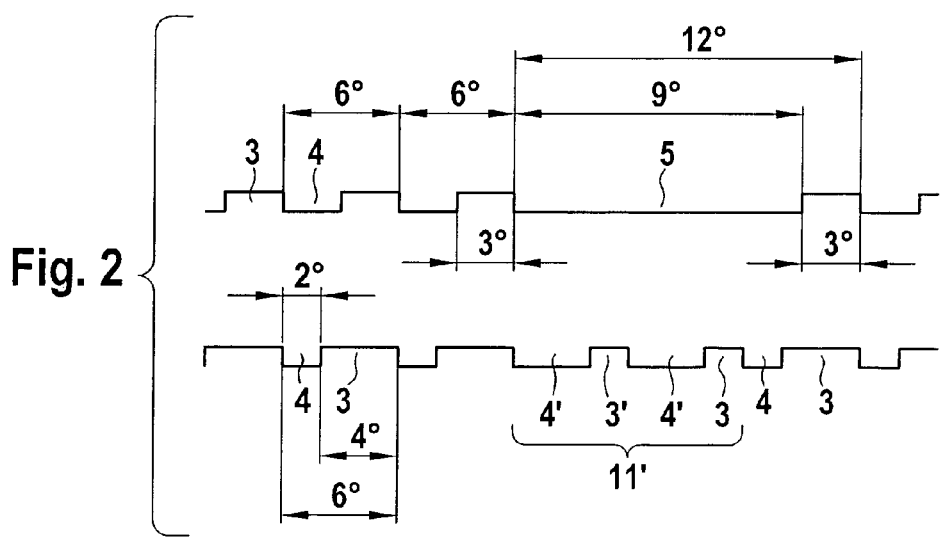
FIG. 2 shows a development of a sensor wheel having a sensor-wheel gap, and a development of a sensor wheel having an asymmetrical pitch.

FIG. 2 shows, at the top, a development of a sensor wheel 1 having a gap 5, and at the bottom, a development of a sensor wheel 1 having an asymmetrical pitch T. The developments are depicted in each case as lines characterizing teeth 3 and tooth gaps 4. The top part of FIG. 2 shows sensor-wheel gap 5, which extends over an angle of 9°. Teeth 3 and tooth gaps 4 each extend over an angle of 3°, so that the spacing between identical edges of teeth 3 is 6° in each case. "Identical edges" are understood, with reference to a square-wave electrical signal, as the respective tooth edges of a tooth 3 that are located on the same side of the tooth with respect to the rotation direction of sensor wheel 1, i.e., for example in a development as depicted in FIG. 2, all the tooth edges located on the right side of teeth 3.

The bottom part of FIG. 2 depicts a sensor wheel 1 having an asymmetrical pitch T. The apportioning of tooth 3 to tooth gap 4 is T=2:1 here, i.e. one tooth extends over an angle segment of 4°, one tooth gap over an angle segment of 3°, on sensor wheel 1. Provided here instead of a tooth gap are two pairs of teeth 3' and tooth gaps 4' for which the pitch T=1:2, i.e. for which teeth 3' extend over an angle segment of 2°, and tooth gaps 4' over an angle segment of 4°.

The two successive pairs of teeth 3' and tooth gaps 4' having the pitch T that is modified with respect to the remaining 58 pairs of teeth 3 and tooth gaps 4 are referred to here as symmetry gap 11'.

Figure 3:
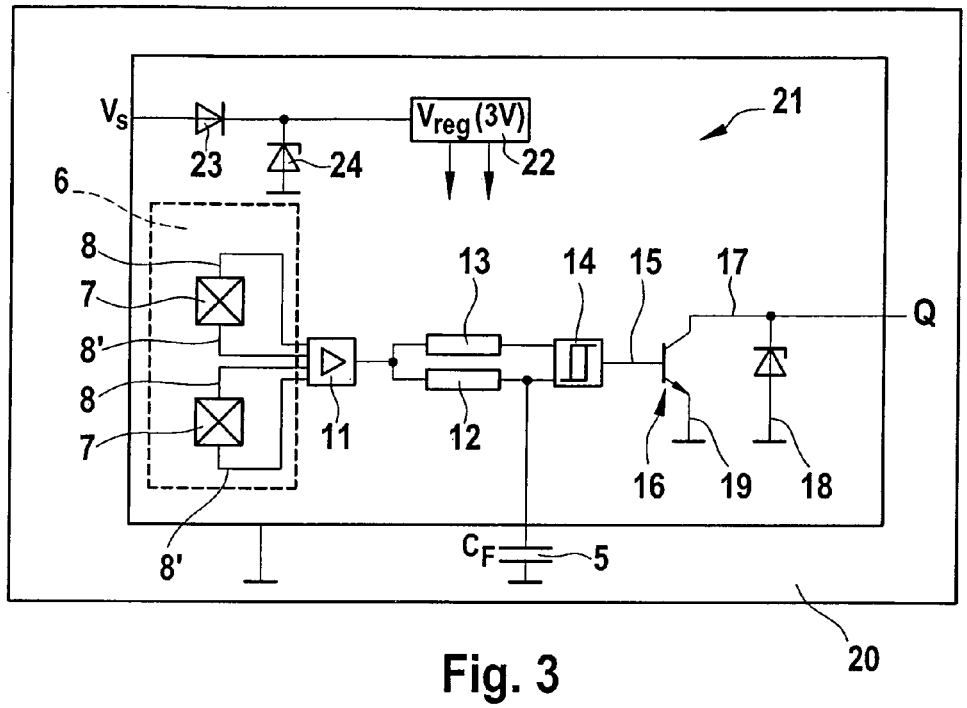
FIG. 3 shows an evaluation circuit for a differential sensor.

FIG. 3 is a block diagram of the circuit of an evaluation unit for processing the signals of a sensor 6. Sensor 6 is delimited from the other circuit elements by a dashed line in FIG. 3. Sensor 6 encompasses, as depicted in FIG. 1, two sensor elements 7 that are connected, via respective connector lines 8 and 8', to a differential amplifier 11. The output signal of differential amplifier 11 is delivered through a high-pass filter 13 to a first input of a Schmitt trigger 14, and through a second high-pass filter 12, which is connected via a capacitor 15 to ground, to a second input of Schmitt trigger 14. At the output of Schmitt trigger 14, a signal is present that is delivered to base 15 of a transistor 16. An output signal is present at collector 17 of transistor 16. Emitter 19 of transistor 16 is connected to ground; a protective diode 18 is connected parallel to the emitter-collector section, i.e. between ground and collector 17 of transistor 16. An amplified and filtered difference signal of the two sensor elements 7 is present at output Q. The circuit shown in FIG. 3 is accommodated, together with sensor 6, in a shared housing, as indicated schematically by a rectangle 20 surrounding the circuit. Power supply unit 21 is depicted in the upper region of the circuit; this encompasses a voltage generation unit 21 that is supplied with voltage via a first protective diode 23 that is connected to a supply voltage $V_S$, and via a second protective diode 24 that is connected to ground.

Of the leading and trailing edges, usually only the leading edges are used, i.e. the edges at a transition from a tooth gap 4 to a tooth 3. The trailing edges are not used. The "leading edge" is understood hereinafter as a synonym for a transition from a tooth gap 4 to a tooth 3, which is converted by sensor 6 into a corresponding electrical signal. A "trailing edge" is correspondingly understood as the transition from a tooth 3 to a tooth gap 4, this transition once again being converted by sensor 6 into an electrical signal. Whether the electrical signal transitions, in the context of a leading edge, from high to low or from low to high depends on the electrical configuration; what is important here is not the electrical definition of the leading and trailing edges, but rather the allocation of the electrical signal to the geometrical transition from tooth to tooth gap.

Figure 4:
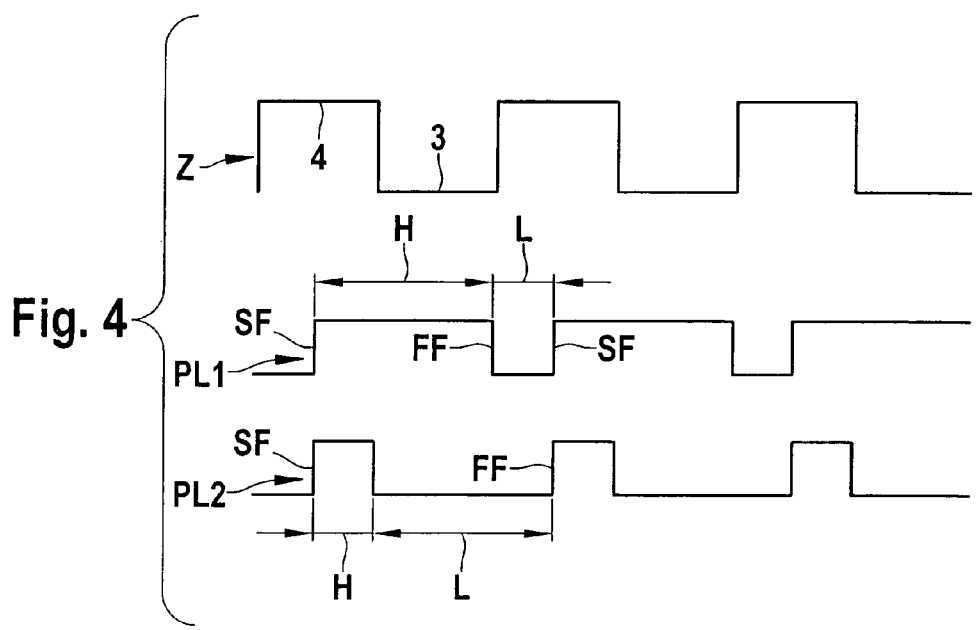
FIG. 4 shows signals having variable pulse lengths.

Because, for reasons of accuracy, only the leading edges are evaluated by downstream control-unit functions, the trailing edge is utilized to code the rotation direction of the crankshaft. One approach, known per se, to transferring this information to an engine control unit is a variable pulse length, as depicted in FIG. 4. The directional information is thus transferred by way of the ratio between high values H and low values L of the signal being transferred. Leading edges SF are transferred without delay or further processing of the signal; in other words, in the context of a differential sensor, the leading edge is transferred to the signal line as soon as sensor wheel 1 has passed by sensor 6 at the center of a tooth 3. Trailing edge FF transfers only the information regarding rotation direction. The ratio of high values H to low values L is explained in FIG. 4. The signal between a leading edge SF and a trailing edge FF is high value H; the signal between a trailing edge FF and a leading edge SF is low value L. Line Z shows part of the development of the sensor wheel. In the case of the signal labeled PL1 in FIG. 4, a pulse width ratio P=(time duration of high value H) divided by (time duration of low value L) has a value much less than one; signal PL2, depicted below, yields a value much greater than one for the pulse width ratio. By way of the differing pulse width ratios P=H/L it is thus possible to transfer from sensor 6 to a control unit a datum regarding the rotation direction.

Provision is made according to the present invention also to transfer, in addition to the rotation direction, the tooth pitch, i.e. the ratio of tooth length to tooth-gap length on the sensor wheel. In the case of an asymmetrical pitch of the sensor wheel as presented above, there are two pitches of tooth 3 to tooth gap 4, namely a 2:1 pitch and a 1:2 pitch, the latter representing a marking similar to the sensor-wheel gaps known in the existing art. Provision is now made, according to the present invention, to code these two different pitch ratios by way of the pulse width of the signal being transferred.

In addition to the two rotation directions (left and right), the two pitch ratios, which are designated TV1 and TV2, are now also transferred. The transfer is coded in such a way that from a single value, namely the pulse width ratio P, both the rotation direction and the pitch are transferred. There are a total of four combinations of rotation direction and pitch ratio, which are presented in Table 1 below.

TABLE 1

|  |  | TV1 = 1 | TV2 = 1 |
|---|---|---|---|
|  |  | 2 * TB | 4 * TB |
| RD left | 1 * TB | 3 * TB | 5 * TB |
| RD right | 2 * TB | 4 * TB | 6 * TB |

"TV1=1" means that the pitch is 2:1; "TV2=1" means that the pitch is 1:2. "RD left" and "RD right" are the two rotation directions of the crankshaft. Coding is accomplished here by adding numerical values for the rotation direction and pitch ratio, so that the numerical values are unequivocal. Any other codings that are unequivocal are possible here.

Figure 5:
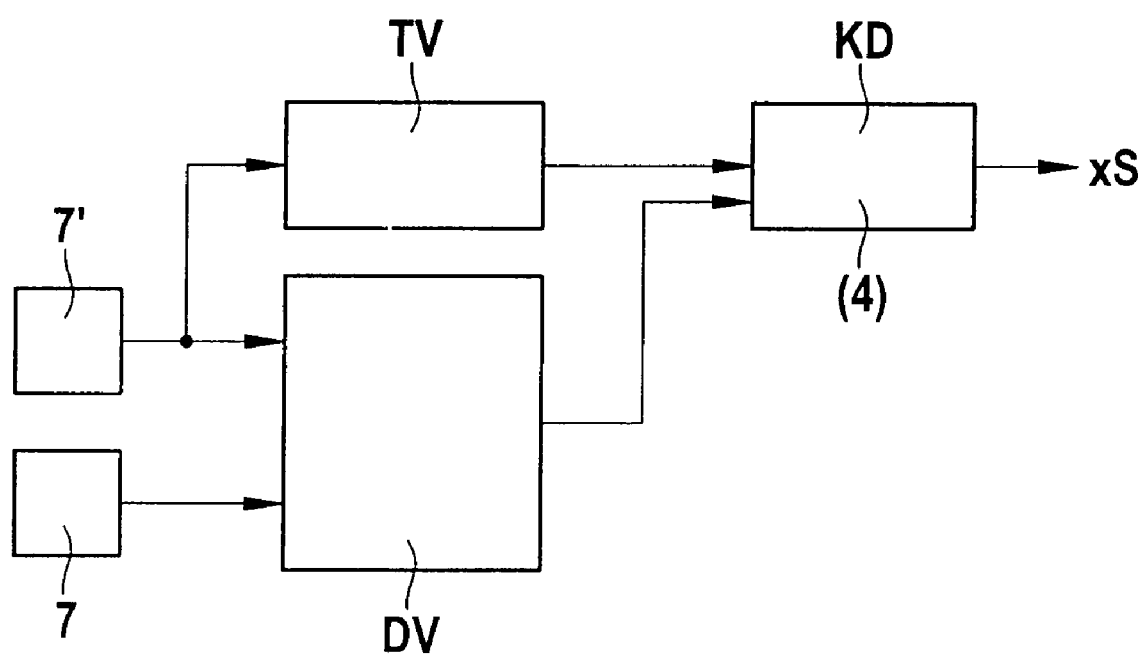
FIG. 5 is a sketch of a circuit for signal processing of the output signals of two sensor elements.

FIG. 5 is a sketch of a circuit for signal processing of the output signals of two sensor elements 7 and 7' that are disposed together in a differential sensor 6. The output signals of sensor elements 7 and 7' are delivered to a differential amplifier DV at whose output the difference signal is present, in the form of a square-wave signal, as an image of sensor wheel 1. The signal of one of sensor elements 7 or 7'—in this case, as an example, the signal of sensor element 7'—is delivered, in order to determine the pulse duty factor and therefore the pitch ratio of the tooth-plus-tooth gap pair presently being carried past differential sensor 6, to an assembly TV for determining the pulse duty factor. A signal that represents the pitch is present at the output of assembly TV. The outputs of assembly TV and of differential amplifier DV are delivered to a coding device KD that codes the signals in accordance with the description of FIG. 4 and makes them available at an output XS for delivery to an engine control unit.

Figure 6:
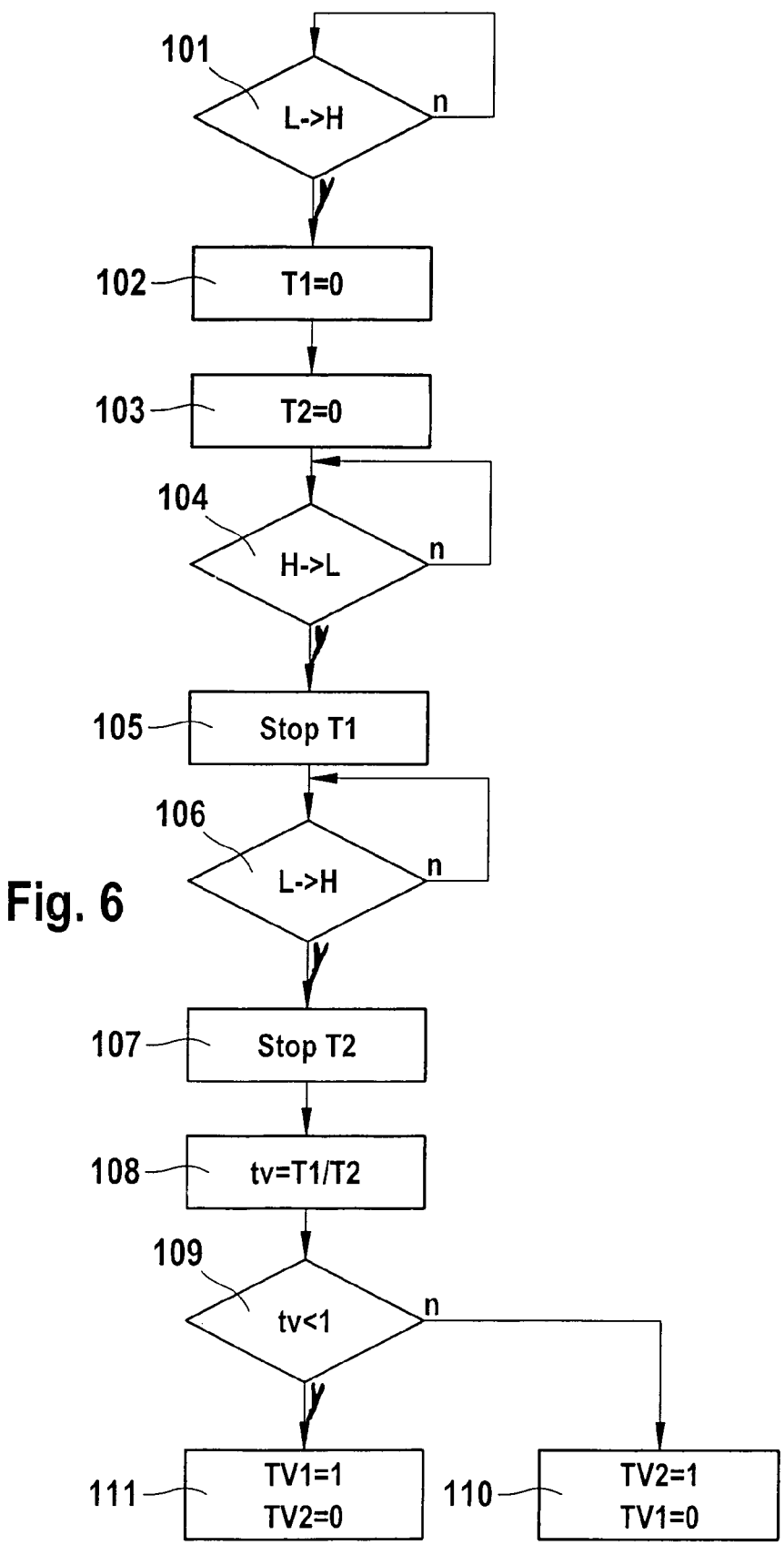
FIG. 6 is a flow chart of a method for determining the pitch ratio.

FIG. 6 is a block diagram of an exemplifying embodiment of a method for determining the pitch ratio TV1 and TV2. The output signal of a sensor element 7, 7' operating, for example, on the Hall principle is a voltage signal that represents, with its times at a high and a low level, an image of sensor wheel 1, or more precisely an image of the sequence of teeth 3, 3' and tooth gaps 4, 4'. A step 101 of the method firstly checks whether a low-to-high edge is present. If this is not the case (indicated by option N), execution then branches back to the beginning of step 101. If a low-to-high edge was detected (indicated by option Y), then in step 102 a timer T1 is set to zero and started. In step 103 a timer T2 is set to zero and started; steps 102 and 103 can also occur in parallel. Step 104 checks whether a high-to-low edge has been detected. If this is not the case (indicated by option N), execution branches back to the beginning of the checking step in step 104; if a high-to-low edge was detected (indicated by option Y), timer T1 is then stopped in step 105. Step 106 then checks whether a low-to-high edge is present. If this is not the case, this checking step is repeated (indicated by option N); if a low-to-high edge is present (indicated by option Y), then timer T2 is stopped in step 107. The pulse duty factor TV is then determined in step 108. The pulse duty factor TV is the quotient of the time measured by timer T1 divided by the time measured by timer T2, i.e. TV=T1/T2; the designations refer both the timers as such and to the times measured by them, i.e. T1, for example, means both timer T1 and the time measured by timer T1. Step 109 then checks whether the pulse duty factor is more or less than one. If the pulse duty factor is less than one (indicated by option N), then a value TV2=1 is set in step 110. Simultaneously, the value TV1=0 is set. If the pulse duty factor TV is greater than one (indicated by option Y), then in step 109 the value TV1=1 is set in step 111, the value TV2=0 being set. Values TV1 and TV2 can therefore assume a value of one only in alternation.

What is claimed is:

1. A method for coding an output signal of a sensor of an apparatus for determining a rotation angle of a shaft, the shaft being joined to a sensor wheel having teeth and tooth gaps having an asymmetrical pitch, and the sensor wheel having associated with it at least one differential sensor encompassing two sensor elements, the differential sensor generating an output signal that is a difference of signals of the two sensor elements, the output signal being a square-wave signal that can assume a first value or a second value, the method comprising:
   ascertaining a rotation direction of the shaft, as well as a pitch of a tooth sweeping past the sensor with respect to an adjacent tooth gap, from the signals of the two sensor elements; and
   coding the rotation direction as well as the pitch as a pulse width coded output signal.

2. The method according to claim 1, wherein the shaft is a crankshaft of an internal combustion engine.

3. The method according to claim 1, wherein the pitch is an angle segment of a tooth with respect to an angle segment of a successive tooth gap.

4. The method according to claim 1, wherein the sweeping of a leading tooth edge of the sensor wheel past the sensor is coded in real time as an edge, and a counter-edge following the edge is generated at an offset in time from the edge, which offset codes the rotation direction as well as the pitch.

5. The method according to claim 1, wherein the rotation direction is ascertained from a sequence in time of the signals of the sensor elements.

6. The method according to claim 1, wherein the pitch is ascertained from the signal of one of the sensor elements.

7. A sensor of an assemblage for determining a rotation angle of a shaft, the shaft being joined to a sensor wheel having teeth and tooth gaps having an asymmetrical pitch, the sensor comprising:
   at least one differential sensor encompassing two sensor elements associated with the sensor wheel, the differential sensor generating an output signal that is a difference of signals of the two sensor elements, the output signal being a square-wave signal that can assume a first value or a second value;
   an arrangement for ascertaining a rotation direction of the shaft, as well as a pitch of a tooth sweeping past the sensor with respect to an adjacent tooth gap, from the signals of the two sensor elements; and
   an arrangement for coding the rotation direction as well as the pitch as a pulse width coded output signal.

8. The sensor according to claim 7, wherein the shaft is a crankshaft of an internal combustion engine.

9. A computer-readable medium containing a computer program which when executed by a processor performs the following method for coding an output signal of a sensor of an apparatus for determining a rotation angle of a shaft, the shaft being joined to a sensor wheel having teeth and tooth gaps having an asymmetrical pitch, and the sensor wheel having associated with it at least one differential sensor encompassing two sensor elements, the differential sensor generating an output signal that is a difference of signals of the two sensor elements, the output signal being a square-wave signal that can assume a first value or a second value:
   ascertaining a rotation direction of the shaft, as well as a pitch of a tooth sweeping past the sensor with respect to an adjacent tooth gap, from the signals of the two sensor elements; and
   coding the rotation direction as well as the pitch as a pulse width coded output signal.

* * * * *